M. KALLMANN, DEC'D.
P. KALLMANN, ADMINISTRATRIX.
STARTING DEVICE FOR ALTERNATING AND THREE-PHASE CURRENT MOTORS.
APPLICATION FILED MAR. 25, 1909.

1,127,263.                                        Patented Feb. 2, 1915.

UNITED STATES PATENT OFFICE.

MARTIN KALLMANN, OF BERLIN, GERMANY; PAULA KALLMANN, OF BERLIN, GERMANY, ADMINISTRATRIX OF SAID MARTIN KALLMANN, DECEASED.

STARTING DEVICE FOR ALTERNATING AND THREE-PHASE CURRENT MOTORS.

1,127,263.  Specification of Letters Patent.  Patented Feb. 2, 1915.

Application filed March 25, 1909. Serial No. 485,845.

*To all whom it may concern:*

Be it known that I, MARTIN KALLMANN, electrical engineer, citizen of Germany, residing at Kurfuerstendamm 40/41, Berlin, Germany, have invented new and useful Improvements in Starting Devices for Alternating and Three-Phase Current Motors, of which the following is a specification.

According to the hereinafter described invention the device of so-called variation-starters described in the Patent No. 829,340 issued to the present applicant Aug. 21, 1906, according to which conductors of a high positive temperature-coefficient, for instance iron wires or bands (variators) are inserted into the circuit of the motor to be started, is extended to alternating current and three-phase motors, while for these kinds of motors special, suitable systems of connecting the variators have been used.

In Figures 1 to 8 are illustrated diagrammatically different forms of construction of the invention, the main object of which is to effect the starting and stopping of the motor merely by closing and opening the stator-circuit, therefore, as far as possible, without opening and closing the rotor-circuit.

Figure 1:
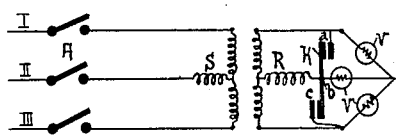
Figure 2:
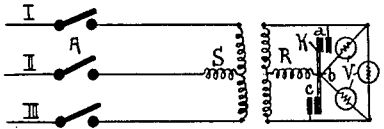
Figure 3:
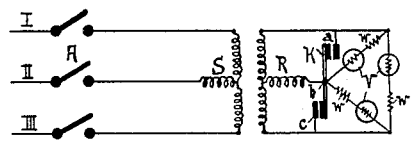
Figure 4:
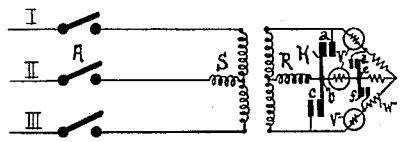
Figure 5:
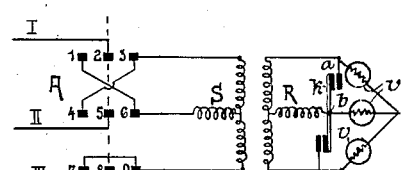
Figure 6:
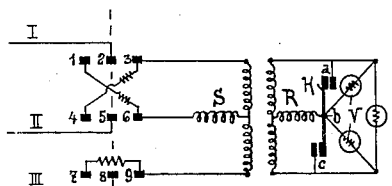
Figure 7:
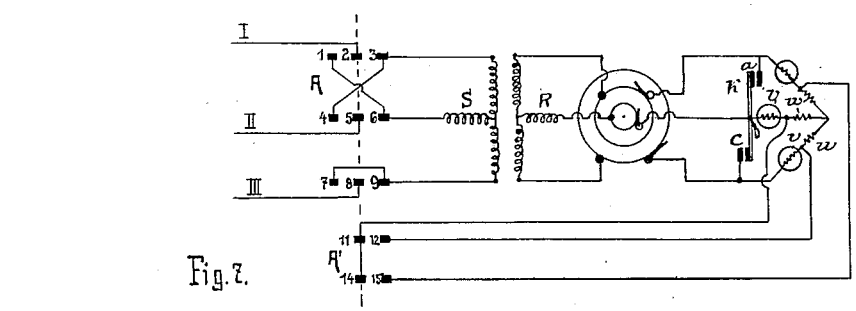
Figure 8:
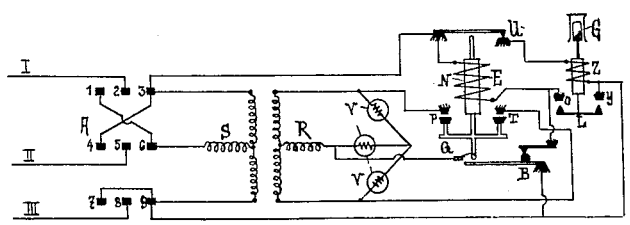

Fig. 1 shows the invention in its simplest form; Fig. 2 is similar to Fig. 1, except that the variators are differently connected; Figs. 3 and 4 show an additional resistance of low temperature coefficient, as applied to the forms shown in Figs. 1 and 2; Fig. 5 shows the invention so applied to a three phase motor, that the latter may be started in either direction; Fig. 6 illustrates an arrangement for braking; Fig. 7 shows a construction in which provision is made for taking care of excessive tension in the event of sudden reversal of the motor; Fig. 8 shows how the arrangement may be controlled automatically.

This is effected in Fig. 1 in the most simple and in a general way in a manner that the rotor-circuit R is closed in itself permanently—also when the motor is without current—by the three variators or groups of variators V arranged in star connection. If the stator-switch A is closed, the rotor starts and at first a somewhat considerable impulse is felt in consequence of the variators being still cold. But these become heated in a very short time and when red-hot they reach about the eighth-fold of their initial state so that there is obtained a starting-current which is hereby automatically regulated. After some time, for instance 2 to 15 seconds, corresponding practically with the usual starting-time, the star-shaped variation-resistance is short-circuited at $a$ and $c$ through the switch K turning on pivot $b$ and the starting-period is terminated. This can be effected without any considerable sparking, as the iron resistances made red-hot, or at least very hot, after being first inserted absorb with the rapidly increasing speed of the rotor a constantly diminishing voltage in consequence of which they lose their degree of heat. At the time of the short-circuiting they possess so little resistance that on their being switched off, no serious sparking can occur. The advantage of this switching with a constantly closed rotor-circuit consists therein that the starting and stopping can only be effected by the stator-leads I, II, III, so that it is possible to easily regulate the motor at a distance merely by these three leads, and it even is sufficient to break and close only two netleads, while the third can permanently lie on the stator $s$. The switch K can be operated by any suitable means.

Fig. 2 is in its essential features exactly similar to Fig. 1, but the variators V are here connected in a triangle. By being able to select at will the star or triangle connections in the rotor-circuit, different variator elements, which are just at disposal, may be used. Thus, for instance, for a certain motor, if only variators absorbing about 110 volts of tension are at disposal, the triangle-connection might be used, but if there are only those for about 65 volts at disposal they must be put with the same motor in star-connection, provided that these tensions correspond with the supposed type of motor. The number of the parallel variator resistances or the susceptibility of the groups is selected according to the normal requirement of current of the motor in the rotor-circuit, taking into consideration the desired starting-momentum (full load, no load and so on) and the connection used (star or triangle or the like).

Figs. 3 and 4 differ in so far from Figs. 1 and 2 as there is intercalated before each variator, for the purpose of weakening the initial impulse, a resistance W of a small temperature-coefficient, for instance of nickeline. In Fig. 3 the latter is short-circuited at the end of the starting-period together with the variators through the switch K while in Fig. 4 the switching off of the resistance in the rotor-circuit takes place in two steps, in the first place there are switched off, for instance after 3 seconds, the constant resistances W by the contacts $d$ and $f$ of the switch turning on $e$ and, for instance, after a further 3 seconds, also the variation-resistances V at $a$ and $c$ by the switch K turning on $b$. In Figs. 3 and 4 there can at will be used again the star or triangle connection. In practice the switching off in two steps can, as a rule, be dispensed with.

In Fig. 5 is illustrated the starting of a three-phase motor in both directions. There is effected here by the reversing-switch A an exchange of two feeds I and II leading to the stator $s$ in consequence of the cross-connection of the contacts 1 and 6, or 3 and 4, while the third lead III remains lying on the same terminal of the stator by means of the contacts 7 and 9. The leads I, II, III lead to the pivots of the switches 2, 5 and 8. For the rest the switching off of the variators, to which may be joined up also constant additional resistances, for weakening the current, as will at once be seen, is effected by the switch K. It is evident that also here the starting and stopping of the motor for a self-acting reversing-starter in both directions can be effected in the most simple manner by the stator alone, while the circuit of the rotor may be kept permanently closed by the variators and other resistances, and the same variators and the same switch K serve in both directions in the same manner.

Fig. 6 shows an arrangement for braking with alternating-current as is not seldom done with threephase current. While the circuit of the rotor, in the star or triangle connection of the variators, does not differ from Fig. 5, there is here connected to the reversing-switch A of the stator-circuit which in other respects is arranged the same as in Fig. 5, a reducing-resistance $x$ in the connections of the contact 1 with 6, 3 with 4 and 7 with 9, which may consist of resistance material with a small temperature coefficient, or of variators, and the object of which is to weaken in the case of a sudden braking, that is to say reversing of the switch on the contacts 1, 4 and 7 the impulse and thereby the tension acting on the variators V at the moment of the reversal, as during this reversal of the current for the purpose of the counter-current braking, there occurs a considerably increased tension in the circuit of the rotor which might destroy the variators, which are only intended for one direction of movement, therefore for a normal rotor tension. Of course the starting momentum in the opposite direction of rotation, therefore in the direction of the action of the brake, is considerably weakened by the resistances in the stator, but may be sufficient in practice for the braking.

In Fig. 5 such a protection-device for the sudden reversing of the movement has not been provided. Precautions have been taken here against the overloading of the variators during the reversing of the current, either by making a sufficiently long pause in the disconnection of the reversing-switch A, with a simultaneous mechanical, magnetic or other braking-action or the variators V must be from the beginning so large with regard to the tension they have to absorb, or so numerous in multiple connection, that they are able to absorb the suddenly increased amount of energy at the moment of the rapid reversal of the motor running with nearly its full speed in the original direction.

In Fig. 7 the following arrangement has been made for the tension of the variators in the case of a sudden reversal of the movement. In the normal direction of rotation, therefore on the contacts 3, 6 and 9 of the switch A there are at the beginning only the variators V in the rotor-circuit, as by the simultaneous contact-closing by means of $A^1$ at 11, 12 and 14, 15 the additional resistances W are short-circuited from the beginning. If, on the other hand, for the purpose of braking with the counter-current the switch A is reversed on the contacts 1, 4 and 7, the resistances W are no longer short-circuited, as the secondary switch is only one-sided. For the purpose of weakening the excessive tension acting otherwise on the variators in the case of a sudden reversing of the movement, there is inserted, when the braking takes place, before each variator, a protecting-resistance W of nickeline or other material of a small temperature-coefficient, instead of which also an additional variator for each variator may be selected which is only joined up in circuit when the counter-current is switched on for the purpose of increasing the total susceptibility of the variators.

Fig. 8 finally shows the application of the hereinbefore described devices, on which the systems of switching are based with the use of automatic switching-devices in the rotor-circuit, as a sample, in one form of construction. The short-circuiting of the variators, or also of the additional resistances may be effected in any suitable manner.

If the arrangement is however made electrically or electromagnetically, the influencing of the automatic switches is most advantageously done from the stator-circuit. Thus, for instance, the switching-device may be fitted out in a simple manner with a time-regulator (air, fluid or other damping G which is connected with an electromagnetic relay Z. If the main switch A of a one-sided or of a reversing-starter connects the stator-leads I, II, III in one direction or the other, there is joined up in the circuit, in addition to the starting-device for the rotor R illustrated in the aforementioned figures, the winding Z (time-relay) by the tension-leads connected at 3 and 9, as the contact U is closed at first. After a few seconds, which can be regulated, the armature of the time-relay L closes at O and Y also the circuit of the winding E of a distant switch, which now attracts through its core N the armature Q, and closes contacts at P and T. Hereby the variators V and other resistances in the circuit of the rotor are short-circuited, and the disconnection is hereby completed. If the core N is attracted it raises itself at the same time away from a resilient contact B, which is thereby closed and thus connects the winding E of the distant switch now directly, therefore independently of the contacts O and Y of the time-relay to the feeds of the stator. After closing the contact at P and T, and after the closing of B by the core N of the armature, the contact U is opened and the excitation of the winding Z of the time-relay, which has now become superfluous, is interrupted. The time-relay need therefore only work for a few seconds and may be constructed accordingly.

As will be seen, the automatic switching-device, consisting of a distant switch with time-regulator, acts in the same way for both directions of rotation of the motor. Also here the disconnecting may take place in several steps, and the above described combinations with star and triangle connection and with and without additional resistances may be used.

Similar to the hereinbefore described system of switching for a three phase-rotor is the use of variators with alternating current motors of a different number of phases.

I claim—

1. In a starting device for three phase alternating current motors, a closed rotor circuit including a resistance of high positive temperature coefficient, means for short circuiting the latter, a stator circuit, a current reversing device connected therewith, a substantially constant resistance in the rotor circuit, and means associated with the reversing device for controlling such constant resistance.

2. In a starting device for three phase motors, a closed rotor circuit, a resistance of high positive temperature coefficient therein, means for short circuiting such resistance, a stator circuit, a current reversing device connected therewith, a substantially constant resistance, and means for including the latter in the circuit first mentioned when the current is reversed.

3. In a starting device for three phase motors, a closed rotor circuit, a resistance of high positive temperature coefficient therein, means for short circuiting such resistance, a stator circuit, a current reversing device connected therewith, and means for reducing the tension on the resistance when the current is reversed.

In testimony whereof I have signed my name to this specification in the presence of two subscribing witnesses.

MARTIN KALLMANN.

Witnesses:
HENRY HASPER,
WOLDEMAR HAUPT.